United States Patent [19]

Jen et al.

[11] Patent Number: 5,679,763
[45] Date of Patent: Oct. 21, 1997

[54] POLYQUINOLINE-BASED NONLINEAR OPTICAL MATERIALS

[75] Inventors: Kwan-Yue Alex Jen, Old Bridge, N.J.; Yongming Cai, West Chester, Pa.

[73] Assignee: Enichem S.p.A., Italy

[21] Appl. No.: 394,382

[22] Filed: Feb. 24, 1995

[51] Int. Cl.⁶ .................................. C08G 75/56
[52] U.S. Cl. .................. 528/403; 528/373; 528/376; 528/422; 544/300; 544/301; 548/524; 548/526; 548/577; 252/582; 252/501.1; 252/518; 252/519
[58] Field of Search ............... 252/582, 501.1, 252/518, 519; 528/403; 544/300, 301; 548/524, 526, 577

[56] References Cited

U.S. PATENT DOCUMENTS 5,514,799  5/1996  Varanasi et al. ............ 544/300

FOREIGN PATENT DOCUMENTS

| | | |
|---|---|---|
| 0 493 716 A1 | 7/1992 | European Pat. Off. . |
| 0 585 999 A1 | 3/1994 | European Pat. Off. . |
| 0 602 654 A1 | 6/1994 | European Pat. Off. . |
| 0 637 774 A1 | 2/1995 | European Pat. Off. . |

OTHER PUBLICATIONS

Cai et al., SPIE, 2528, 128–134 (Jul. 12, 1995).

Lee et al., Optical and Quantum Electronics 27, 371–377 (May 1995).

Agrawel et al., Macromolecules, 26 (26), 895–905 (1993).

Ashwini et al., J. Phys. Chem. 96, 2837–2843, (1992).

*Primary Examiner*—Nathan M. Nutter
*Assistant Examiner*—Duc Truong
*Attorney, Agent, or Firm*—Lerner, David, Littenberg, Krumholz & Mentlik

[57] ABSTRACT

A composition exhibiting a second order nonlinear optical properties containing a non-centrosymmetric aromatic nonlinear optical compound possessing a delocalized resonance configuration as a guest in a host polyquinoline polymer matrix.

33 Claims, No Drawings

POLYQUINOLINE-BASED NONLINEAR OPTICAL MATERIALS

BACKGROUND OF THE INVENTION

1. Field of the Invention

The present invention relates to nonlinear optical (NLO) materials based on a host polyquinoline polymer matrix in combination with a non-centrosymmetric aromatic NLO compound possessing a delocalized resonance configuration, present as a guest in the host polymer matrix. In particular, the present invention relates to NLO materials having improved chemical and thermal stability.

The compounds of the present invention are stable in processing solvents and at processing temperatures used in the production of electro-optic devices. When suitably oriented, the compounds are capable of highly efficient second harmonic generation and electro-optic modulation of an electromagnetic wave having a wavelength between 300 nm and 2,000 nm.

2. Description of the Prior Art

Highly efficient NLO materials capable of doubling or tripling the frequency of incident light are currently of great scientific and technological interest for use in optical telecommunications, signal processing and the construction of optical computers. Nonlinear optics is concerned with the interaction of electromagnetic fields in various media to produce new fields which may be altered in phase, frequency or amplitude. The NLO effect of a material upon an electromagnetic field is a function of the second and higher order terms of the following equation:

$$P = \alpha E + \beta E^2 + \gamma E^3 + \ldots$$

P is the polarization of a material, E is the intensity of the electric field, and the coefficients $\alpha$, $\beta$, and $\gamma$, etc., are indicative of the NLO susceptibility of the material. Such coefficients are constant for a given material, but vary from material to material. The second order coefficient, $\beta$, for a given material, is indicative of the second harmonic generation properties of the material, with second harmonic generation efficiencies increasing as the value of $\beta$ increases.

Candidate NLO materials should possess good physical properties, such as high optical transparency, low dielectric constant and high laser damage threshold. The materials should also possess the molecular nonlinearity required of NLO materials, in particular, high $\beta$ values, fast response times and nonlinear susceptibility over a broad range of wavelengths, particularly of wavelengths between 300 nm and 2,000 nm.

Recent efforts in the development of NLO materials have focused on non-centrosymmetric organic materials with large delocalized pi-electron systems, which exhibit great nonlinear susceptibilities and can be varied to optimize the desired physical and mechanical properties. This includes the single benzene ring derivative disclosed by U.S. Pat. No. 4,894,186 to Gordon and the compounds derived from two to four benzene rings separated by pi-electron conjugated carbon-carbon, carbon-nitrogen and nitrogen-nitrogen bridges disclosed by U.S. Pat. No. 4,892,681 to Myata et al., U.S. Pat. No. 4,894,263 to Dubois et al., U.S. Pat. No. 4,933,112 to DeMartino et al. and U.S. Pat. No. 4,935,292 to Marks et al., and the five-membered heteroaromatic ring compounds linked by pi-electron conjugated bridges disclosed by U.S. patent application Ser. No. 07/626,358, filed Dec. 12, 1990. The disclosure of this patent application is hereby incorporated herein by reference thereto.

To induce charge asymmetry, and consequently second order nonlinear polarizability, an aromatic ring at one end of the NLO compound structure is substituted with an electron donating group, while on the other end of the NLO compound structure, an aromatic ring is substituted with an electron accepting group. The dipole of the compound structure can then be aligned in accordance with the method described by U.S. Pat. No. 4,935,292, the disclosure of which is hereby incorporated herein by reference thereto.

NLO compounds are typically formed into a nonlinear optical material by combining the NLO compound with a medium that is chemically inert to the compound. For example, the NLO compound can be layered on a substrate such as glass, silica or polymeric materials, as described in U.S. Pat. No. 4,894,186 to Gordon. Preferred nonlinear optical materials are formed by combining the NLO compound as a host in a thermoplastic polymer matrix. This combination is also described in U.S. Pat. No. 4,894,186. NLO compounds can also be covalently attached as side chains to the monomeric subunits of polymers as disclosed by U.S. patent application Ser. No. 07/626,358.

Desirable matrix polymers have excellent optical transparency, good film-forming characteristics, low dielectric constants and a relatively high $T_g$ for stable dipole orientation of the side chains. Other properties come into consideration, depending upon the particular end-use requirements of the material.

A leading group of polymers under consideration for use in the production of NLO devices are the high $T_g$ polyimides. Most polyimides are coated as an amic acid prepolymer which, after solvent removal, is thermally converted in a ring-closing reaction to the final polyimide. During this imidization process, the very acidic environment (pH=2), polar processing solvents and by-products formed at high temperatures (150° C.–200° C.) are very reactive to the NLO compounds. Candidate NLO compounds to be introduced into polyimide polymer matrices must survive the stringent processing conditions required to produce the polyimides.

NLO compounds have been developed that are stable in polyamic acid solvents, both at room temperature and at curing temperatures (See U.S. patent application Ser. No. 08/132,707, filed Oct. 6, 1993 (the disclosure of which is hereby incorporated herein by reference thereto). Nevertheless, there remains a need for high $T_g$ matrix polymers for NLO materials having excellent optical transparency, good film-forming characteristics and low dielectric constants that do not subject NLO compounds to severe processing conditions.

SUMMARY OF THE INVENTION

This need is met by the present invention. It has now been discovered that the underinvestigated polyquinoline family of polymers possess a unique combination of properties desirable for matrix polymers in high performance NLO materials. Polyquinolines possess the thermal stability required for dipole orientation of the NLO material, yet are processed as fully cyclized polymers requiring no low pH curing step performed in a highly polar solvent. The less severe processing conditions make it possible to use polyquinolines with a wider variety of NLO compounds than can be used with polyimides.

Therefore, in accordance with the present invention, there is provided a combination exhibiting second order nonlinear optical properties based on a non-centrosymmetric aromatic NLO compound possessing a delocalized resonance configuration as a guest in a host polyquinoline polymer matrix.

The NLO compounds of this combination preferably have an external field-induced molecular alignment. In one aspect of this embodiment of the invention, the NLO compound is in the form of a blend of the guest NLO compound in the host polymer matrix. In yet another aspect of this embodiment of the present invention, pendant side chains of the NLO compounds are covalently bonded to the polyquinoline polymer matrix. The polyquinoline preferably contains one or more monomeric subunits having a reactive group capable of being covalently attached to the NLO compound. More preferably, the polymer contains a plurality of the monomeric subunits having the reactive groups covalently substituted with an NLO compound, so that the ratio of the monomeric subunits having reactive groups covalently linked to an NLO compound to monomeric subunits without an NLO compound covalently linked thereto is between 1:99 and about 50:50.

In yet another aspect of this embodiment of the present invention, the host polyquinoline polymer matrix is cross-linked by the NLO guest compounds. Alternatively, the host polymer matrix may be independently cross-linked to form the host matrix for the NLO guest compounds.

The use of polyquinolines as the matrix polymer provides numerous performance advantages to the NLO materials of the present invention. In particular, the polyquinolines possess very low dielectric constants on the order of 2.6–2.8 kHz. Polyquinolines demonstrate a very low moisture uptake compared to polyimides, on the order of 0.10 to 0.15 percent. Unlike polyamic acids, polyquinolines are stable in polar solvent solutions at room temperature. In addition, polyquinolines possess the requisite high glass-transition temperatures (250° C.–380° C.) and thermal stability (>450° C.). The polymers demonstrate low shrinkage and are compatible with plasma or reactive ion etching.

The NLO materials of the present invention accordingly possess heretofore unobtained chemical stability, without sacrificing thermal stability or second order nonlinearity. The materials are easily prepared and have well-known and understood chemical properties.

DETAILED DESCRIPTION OF THE PREFERRED EMBODIMENT

The NLO compounds of the present invention, once suitably oriented, exhibit a high second order NLO susceptibility. Compounds suitable for use as second order NLO chromophore materials according to the present invention have the non-centrosymmetric aromatic structure of Formula I:

wherein D, R and A form a delocalized non-centrosymmetric resonance configuration, in which D is a ring-substituted electron donating moiety, A is a ring-substituted electron withdrawing moiety, and R is a pi-conjugated aromatic moiety. R can be any pi-conjugated aromatic moiety possessing a delocalized resonance configuration. Suitable pi-conjugated aromatic moieties contain from one to ten aromatic rings or fused ring systems. Two or more rings or fused ring systems are linked together to form a delocalized resonance configuration. Within the present specification, "heteroaromatic" rings are defined as being limited to aromatic heterocyclic rings, thereby excluding carbocyclic rings such as phenyl groups. "Aromatic" rings are defined as generically including, carbocyclic and heterocyclic rings. The heteroaromatic rings of the present invention contain one or more heteroatoms selected from O, N, S, Se and Te.

The pi-conjugated aromatic moieties of the present invention preferably contain from one to four aromatic rings or fused ring systems. The aromatic rings or fused ring systems within any pi-conjugated aromatic moiety may be the same or different.

For pi-conjugated aromatic moieties containing a single aromatic ring or a single fused ring system, it is preferable that the single aromatic ring, or at least one aromatic ring of the fused ring system, be a five-membered heteroaromatic ring having one heteroatom selected from O, N, S, Se and Te. The heteroaromatic rings may optionally include up to three additional N atoms. Preferably, the five-membered heteroaromatic rings possess a structure corresponding to Formula II:

in which Y is C or N and X is selected from O, N, N-alkyl, S, Se and Te.

For pi-conjugated aromatic moieties containing multiple rings or fused ring systems, it is preferable that at least one ring alone, or within one of the fused ring systems, is a five-membered heteroaromatic ring having one heteroatom selected from O, N, N-alkyl, S, Se and Te, and up to three additional N atoms. N-alkyl groups should contain up to 18 carbon atoms. Again, five-membered heteroaromatic rings possessing the structure of Formula II are preferred.

Preferably, the pi-conjugated aromatic moieties containing multiple rings or one or more fused ring systems contain two or more of the five-membered heteroaromatic rings, alone, or as part of a fused ring system. Most preferably, all aromatic rings of the pi-conjugated aromatic moieties are five-membered heteroaromatic rings, and all fused ring systems of a pi-conjugated aromatic moiety contain at least one five-membered heteroaromatic ring. When two or more heteroaromatic rings are present in a pi-conjugated aromatic moiety, either alone or as part of a fused-ring system, the rings may have the same or different heteroatoms.

Fused ring systems, when present, should not be so large as to hinder the solubility of the NLO compounds in processing solvents. The point at which fused ring system size interferes with solubility is easily identified by those of ordinary skill in the art. Fused ring systems of two to three rings are preferred.

For pi-conjugated aromatic moieties containing multiple rings or fused ring systems, adjacent rings or fused ring systems may be linked by from one to three pi-electron conjugated functional groups such as carbon-carbon, carbon-nitrogen or nitrogen-nitrogen functional groups. Preferably, the adjacent rings or fused ring systems are bridged by one or two of the conjugated functional groups. When adjacent rings or fused ring systems are bridged by multiple functional groups, the conjugated functional groups may be the same or different. Likewise, with pi-conjugated aromatic moieties having three or more aromatic rings, fused ring systems, or combinations thereof, and therefore, two or more sets of conjugated functional groups bridging adjacent rings or fused ring systems, the individual sets of conjugated functional groups may also be the same or different.

When the aromatic ring is heteroaromatic, or when a fused ring system contains a heteroaromatic ring, the conjugated functional group is preferably substituted on the heteroaromatic ring alpha to a heteroatom. For six-membered rings, alone, or within a fused ring system, the conjugated functional group is substituted para to an electron donating group, an electron withdrawing group, or another conjugated functional group.

The use of pi-electron conjugated functional groups to bridge adjacent rings or fused ring systems in NLO compounds is essentially convention to the art of NLO active organic materials. Examples of suitable ring- or fused ring system-bridging functional groups known in the art include, but are not limited to, —N=N—, —CH=N—, —CH=N—N=CH—, —C≡C— and (—CH=CH—)$_j$, with j being from one to three.

The adjacent rings or fused ring systems of pi-conjugated aromatic moieties containing aromatic rings or fused ring systems may also be linked by non-conjugated linkages. The adjacent rings or fused ring systems may also be directly covalently bonded to one another without forming a fused structure of the adjacent rings or fused ring systems.

The pi-conjugated aromatic moieties of the non-centrosymmetric organic NLO compounds of the present invention can also include a single aromatic ring or a single fused ring system. The preferred single aromatic ring is the five-membered heteroaromatic ring of Formula II depicted above. Single fused ring systems are preferred over single aromatic rings. Fused rings systems containing at least one of the five-membered heteroaromatic rings of Formula II are preferred for both single and multiple fused ring system pi-conjugated aromatic moieties.

The configuration of multiple heteroaromatic rings within a fused ring system is not critical, and may be an all "up" configuration or an alternating and "down" configuration, as depicted in copending and commonly owned U.S. patent application Ser. No. 07/930,732, the disclosure of which is hereby incorporated herein by reference thereto. The heteroaromatic rings of fused ring systems containing multiple heteroaromatic rings may have the same or different heteroatoms.

The heteroaromatic rings of the present invention are not limited to the five-membered heteroaromatic rings depicted in Formula II. Pyridine rings are also suitable for use with the present invention, either alone, or as part of a fused ring system. When present, the pyridine ring should not be quaternized. Such ionic species cause severe current leakage during the dipole-alignment electric field poling process.

From the foregoing description, the aromatic rings and fused ring systems that may be included in the pi-conjugated aromatic moiety represented by R can be easily identified by those of ordinary skill in the art. Suitable rings and ring systems include, but are not limited to, pyrrole, n-alkyl pyrrole, furan, tetrazole, thiophene, pyrazole, pyrimidine, pyridine, purine, guinolines, carbazole, benzene, naphthalene, furazan, pyrazine, indole, isoindole, indazole, phenothiazine, benzotriazole, anthracene, phenanthrene, azophenanthrenes, quinazolines, pteridine, pyrones, chromones, and the like.

Non-centrosymmetric aromatic NLO compounds suitable for use with the present invention also include compounds having structures corresponding to Formula III:

(III)

wherein $A_1$ and $A_2$, $D_1$ and $D_2$ and $R_1$ and $R_2$ may be the same or different, and are selected from the same moieties described above with regard to A, D and R, respectively, with the proviso that one of $D_1$ and $D_2$ may be hydrogen, and that the compound formed by $A_1$, $A_2$, $D_1$, $D_2$, $R_1$ and $R_2$ possesses a delocalized resonance configuration. The NLO compounds of Formula III are described in copending and commonly owned U.S. patent application Ser. No. 08/101,368, filed Aug. 2, 1993, the disclosure of which is hereby incorporated herein by reference thereto.

To induce charge asymmetry, the NLO compounds of the present invention are substituted with an electron donating group and an electron accepting or withdrawing group. Electron donating and electron accepting groups are preferably substituted on five-membered heterocyclic rings that are either single rings or members of fused ring systems, although this is not essential. When substituted on heteroaromatic rings, the electron donating group or electron accepting group is preferably substituted alpha to a heteroatom. For NLO compounds of the present invention containing multiple rings or fused ring systems, the electron donating and electron accepting groups are preferably attached to aromatic or heteroaromatic rings or fused ring systems at opposite ends of the multiple ring structure. For NLO compounds of the present invention consisting of a single fused ring system, the electron donating and accepting groups are substituted to ring members of different rings.

The electron donating groups and electron accepting groups are substituted to the pi-conjugated aromatic moiety so as to form a delocalized resonance configuration. Positions for substituting electron donating and electron accepting groups to form delocalized resonance configurations can be readily determined by those of ordinary skill in the art. Examples of typical delocalized resonance configurations are depicted in the above-cited U.S. patent application Ser. No. 930,732.

The electron donating and accepting groups that are capable of inducing charge asymmetry to pi-conjugated aromatic moieties are essentially conventional to the art of NLO active organic materials. Any functional group capable of withdrawing electrons from an electron delocalized pi-conjugated aromatic ring system is suitable for use as an electron accepting group. Examples of suitable electron accepting groups known in the art include —$NO_2$, —CN, —CHO, —$COR_3$, —$COOR_3$, —$PO(OR_3)_2$, —$SO_2R_3$, —$SO_3R_3$, —$PO(R_3)_2$, dicyanovinylpyrones and —CX=CYZ, wherein X, Y and Z are independently selected from hydrogen, —CN, —$NO_2$, —$COR_3$, —$COOR_3$, —$SO_2R_3$, —$SO_3R_3$, —$PO(R_3)_2$ and —$PO(OR_3)_2$. $R_3$ is an alkyl group containing up to fifteen carbon atoms, and preferably is a methyl group.

Other suitable electron accepting groups include N,N-dialkylbarbituric acids, N,N-dialkylthiobarbituric acids, N,N-diarylbarbituric acids, N,N-diarylthiobarbituric acids, rhodamines, hydrantoins, oxazolines, and a ring system having a structure corresponding to Formula IV:

(IV)

in which $X_1$ and $X_2$ form a saturated or unsaturated five- to eight-membered cyclic ring or two ring system having five- to eight-membered rings, and $X_3$ and $X_4$ are independently $SO_2$ or:

in which $X_5$ is selected from O, S and $CI_1I_2$, wherein $I_1$ and $I_2$ are independently selected from —CN, —$NO_2$, —$COR_3$, —$COOR_3$, —$SO_2R_3$, —$SO_3R_3$, —$PO(R_3)_2$ and —$PO(OR_3)_2$. Examples of ring structures defined by the structure of Formula IV include 3-dicyanovinylindane-1sulfone, 1,3-bissulfonylindane, indane-1,3-dione, 3-dicyanovinylindane-1-one and 1,3-bisdicyanovinylindane.

Strong electron accepting groups are preferred, examples of which include —C(CN)=C(CN)$_2$, —$NO_2$, dicyanoethylene, dinitroethylene, cyanonitroethylene, nitroesterethylene, N,N-dialkylbarbituric acids, N,N-dialkylthiobarbituric acids and the group having the structure pictured in Formula IV, wherein $X_1$, $X_2$, $X_3$ and $X_4$ and $I_1$ and $I_2$ are the same as described above with respect to the structure. The most preferred strong electron accepting group is —C(CN)=C(CN)$_2$, a tricyanoethylene or tricyanovinyl group. Guidance for the selection of electron withdrawing moieties can be found in Nicoud et al., Ch. II–III of *Nonlinear Optical Properties of Organic Molecules and Crystals*, Vol. I (Chemla and Zyss, Eds., Academic Press, Inc., New York 1987), p. 233.

Essentially any functional group capable of releasing electrons into an electron delocalized pi-conjugated aromatic moiety is suitable for use as an electron donating group. Electron donating groups that will induce charge asymmetry to the non-centrosymmetric aromatic NLO compounds of the present invention are also essentially conventional to the art of NLO active organic materials. Guidance for the selection of electron donating groups can also be found in Nicoud et al.

Examples of suitable electron donating groups known in the art include —NR$_6$R$_7$, —OR$_8$, —SR$_8$, —TeR$_8$, —SeR$_8$, —CH=NR$_9$, —CH=N—NR$_6$R$_7$ and CH=C[N(R$_6$R$_7$)]$_2$, wherein R$_6$ and R$_7$ are independently selected from hydrogen, alkyl groups containing up to 12 carbon atoms, alkyl groups functionalized with nucleophilic substituents containing up to 12 carbon atoms and aryl groups. Examples of alkyl groups functionalized with nucleophilic substituents include alkoxy, aminoalkyl, alkylhalide, hydroxyalkyl, alkylsulfide, alkylisocyanate, alkylisothiocyanate, alkylthiol, alkylazide, alkylcarboxylic, alkylsulfonic, alkylalkene and alkylalkyane groups. At least one of R$_6$ and R$_7$ is preferably a functionalized alkyl group through which the electron donating group may be used to covalently attach the guest NLO compound to the host polyquinoline polymer matrix.

R$_6$ and R$_7$ may also together form a cyclic group containing up to eight carbon atoms, including groups such as pyrrolidine, piperidine, piperazine and morpholine. R$_8$ is selected from hydrogen, alkyl groups containing up to six carbon atoms and alkyl groups functionalized with nucleophilic substituents containing up to six carbon atoms. R$_9$ is selected from hydrogen, alkyl groups containing up to ten carbon atoms and alkyl groups functionalized with nucleophilic substituents containing up to ten carbon atoms. The alkyl groups of R$_8$ and R$_9$ are functionalized with the nucleophilic substituents described above with respect to R$_6$ and R$_7$. Additional examples of suitable electron donating groups are depicted by the structures of Formula V:

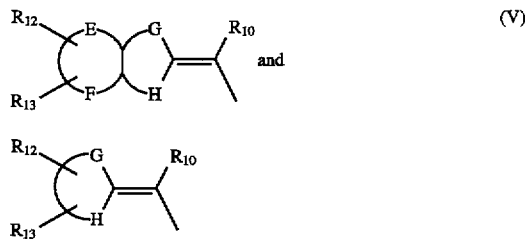

wherein E, F, G and H are members of a saturated or unsaturated five- to eight-membered cyclic ring or two-ring system having five- to eight-membered rings that are electron donating in nature. E, F, G and H are —CH—, —CH$_2$— or heteroatoms independently selected from O, N, S, Se, Te and —NR$_{11}$—. R$_{10}$, R$_{11}$, R$_{12}$ and R$_{13}$ are independently selected from hydrogen, alkyl groups containing up to 18 carbon atoms and functionalized alkyl groups containing up to 18 carbon atoms. The alkyl groups are again functionalized with the nucleophilic substituents described above with respect to R$_6$ and R$_7$.

Examples of suitable one- or two-ring electron donating groups depicted in Formula V include dithiane and dithiolium groups such as 1,3-dithiolium, 2-benzo-1,3-dithiolium and 2-ethylenedithio-1,3-dithiolium, and the like. Whether or not a ring is electron donating in nature to meet the definition of membership in the groups is understood by those of ordinary skill in the art.

Strong electron donating groups are preferred, which significantly increase the second order NLO properties of the compounds in the invention. Examples of strong electron donating groups are —NR$_6$R$_7$, and groups such as pyrrolidine, dithiane, piperidine, piperazine, morpholine and the above dithiolium groups. The most preferred strong electron donating group is a 2-ethylenedithio-1,3-dithiolium group.

The aromatic or heteroaromatic rings or fused ring systems of the NLO compounds of the present invention may optionally be further substituted. Any number of functional groups can be substituted on the aromatic or heteroaromatic ring or rings, provided that the groups are not so large or so numerous to cause undesirable steric hindrance effects, the occurrence of which will be clear to those of ordinary skill in the art.

A preferred embodiment of the present invention includes a second electron donating group, or a second electron accepting group, or both, attached to the same rings, or ring members of fused ring systems, as the respective first electron donating group and the first electron accepting group described above, so that all the electron donating and electron accepting groups present, together with the pi-conjugated organic moiety, form a delocalized resonance configuration. The second electron donating or accepting group may be the same or different than the corresponding first electron donating or accepting group. The inclusion of a second electron donating or electron accepting group increases the second order NLO properties of the resulting material as compared to materials having single-substitution of electron donating and electron accepting groups.

The pi-conjugated aromatic moieties upon which the non-centrosymmetric-organic NLO compounds of the present invention are based are prepared by well-known methods widely reported in the prior art. The preparation of many of the aromatic moieties is disclosed in the above-cited U.S. patent application Ser. Nos. 626,358 and 930,732. Some of the pi-conjugated aromatic moieties are commercially available. The electron accepting groups and electron donating groups can be substituted to the pi-conjugated aromatic moieties using conventional methods.

The non-centrosymmetric aromatic NLO compounds possessing delocalized resonance configurations described above are then incorporated as guests in host polyquinoline polymer matrices. According to the present invention, high molecular weight polyquinolines are polymeric materials comprising, in the polymer backbone, repeating units which contain a quinoline skeleton having the following structure:

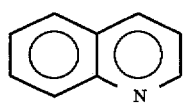

Suitable polyquinolines for use in the present invention include, for example, those described in the publication, "Encyclopedia of Polymer Science and Engineering," Index Volume (J. Wiley & Sons 1990) 279–307, the disclosure of which is incorporated herein by reference thereto.

Polyquinolines are typically formed by the acid-catalyzed condensation/dehydration of ketomethylene compounds with ortho-aminoketones by way of a step growth mechanism. (See, Stille, *Macromolecules,* 14(3), 870–80 (1981); Sybert et al., *Macromolecules,* 14(3), 493–502 (1981).)

Of the above-described polyquinolines suitable for use with the present invention, polyquinolines having the structures set forth in Table I of the above-cited Stille journal article are preferred. Particularly preferred polyquinolines have monomeric repeating units with structures corresponding to Formulae VI–IX in which X and Y are independently selected from O, S, $SO_2$,

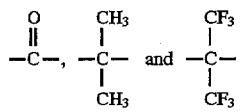

or X and Y may each independently represent a covalent linkage between ring structures; the ring structures linked by X and Y may be substituted meta- or para- to one another by X and Y; and $R_4$ is H or phenyl:

wherein $R_5$ is selected from:

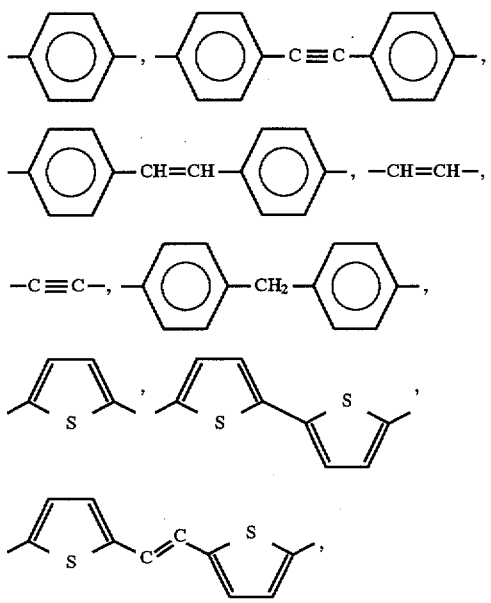

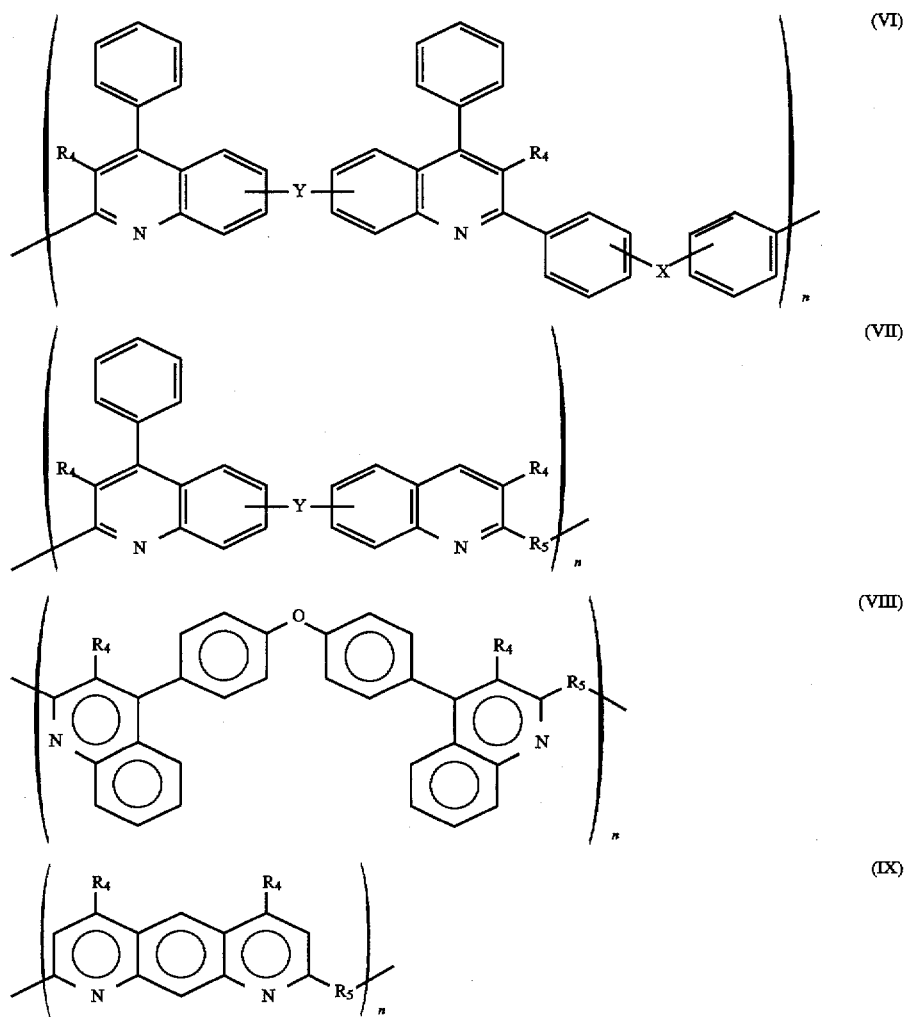

(VI)

(VII)

(VIII)

(IX)

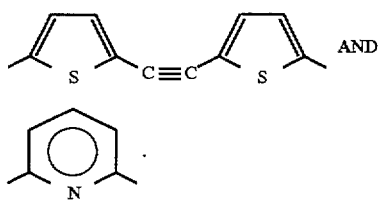

Polyquinolines suitable for use in the present invention have a intrinsic viscosity between about 0.3 and about 4.0 dL/g and a weight average molecular weight between about 10,000 and about 100,000 daltons. Preferred polyquinolines have an intrinsic viscosity between about 1.0 and about 3.0 dL/g and particularly preferred polyquinolines have an intrinsic viscosity between about 1.5 and about 2.5 dL/g. Weight average molecular weights between about 20,000 and about 50,000 daltons are also particularly preferred.

In one embodiment of the present invention, a nonlinear optical medium can be formed by blending the non-centrosymmetric aromatic NLO compounds of the present invention with the host polyquinoline. Typically, the NLO compounds are blended with the polyquinoline at a level between about 1 and about 50 weight percent, and preferably between about 10 and about 30 weight percent. The NLO compounds of the present invention may simply be dissolved in polyquinoline solutions, which are then cured to form a polyquinoline matrix containing the NLO compounds. The polyquinolines are typically dissolved in solvents such as n-methyl pyrrolidone (NMP), dimethyl acetamide (DMAC), dimethyl formamide (DMF), tetrahydrofuran (THF), cyclohexanone, cyclopentanone, and the like, at levels between about 5 and about 25 weight percent, and preferably between about 10 and about 20 weight percent. Alternatively, the polyquinolines can be polymerized in the presence of the NLO compounds of the present invention so that a host polymer matrix is formed within which the NLO compound is present as a guest molecule.

The NLO compounds of the present invention can also be covalently attached as side chains to the polyquinolines. The NLO compounds may be directly attached as side chains to a polymerized polyquinoline, or, in the alternative, the NLO compounds may first be covalently attached as side chains of a polyquinoline monomer which is then copolymerized with a monomer having no NLO side chain to form a polyquinoline having NLO side chains. The NLO polymers are then recovered and purified by conventional means known to those of ordinary skill in the art.

Although the polyquinolines described in the above-cited journal articles and the monomers from which they are polymerized do not have functional groups for the attachment of NLO side chains, the polymers, or the monomers from which they are polymerized, can first be functionalized to form a reactive group for the attachment of the NLO compound by methods equivalent to the chloromethylation of polystyrene and the subsequent conversion to the more reactive iodomethyl derivative set forth in U.S. Pat. No. 4,935,292 to Marks, the disclosure of which is herein incorporated by reference thereto.

Alternatively, a functionalized derivative of the polyquinolines, or the monomers from which they are polymerized, may be employed. For example, a monomer having hydroxyl-substituted aromatic rings may be utilized to polymerize a polyquinoline in which the corresponding aromatic ring is hydroxyl substituted. The hydroxyl substituent then serves as the location for the attachment of the NLO compound as an NLO side chain. The NLO compound is either attached to the monomer before polymerization, or to the polymer after polymerization.

Polyquinolines with side chains of the NLO compounds described above covalently attached thereto are thus prepared by reacting a polyquinoline or monomer thereof having a reactive functional group with an NLO compound capable of reacting with the functional group to form a covalent linkage to the polyquinoline. Preferred NLO compounds capable of reacting to form a covalent linkage with a polyquinoline incorporate an electron donating group containing an alkyl group functionalized with a nucleophilic substituent. The electron donating group of the NLO compound is thereby covalently linked to the reactive functional group of the polymer or monomer.

The NLO compounds of the present invention may include more than one electron donating group containing a nucleophilic substituent capable of reacting with a polymer or monomer functional group to covalently link the NLO compound thereto. The NLO compounds may thus be attached between two or more polymers or monomeric subunits thereof, thereby cross-linking polymer chains.

Preferred polyquinolines having side chains of the NLO compounds of the present invention covalently attached thereto will not be completely substituted with NLO groups. The present invention includes polymers having ratios of NLO substituted monomeric subunits to unsubstituted monomeric subunits between about 1:99 and about 90:10. Substitution ratios between about 10:90 and about 75:25 are preferred. Substitution ratios less than about 60:40 are more preferred in order that the polymer remains soluble in processing solvents. The most preferred substitution ratio is about 50:50.

The polymerization of the polyquinolines of the present invention from monomers having side chains of the NLO compounds of the present invention is essentially conventional and readily understood by those of ordinary skill in the art. The polymerization is performed in a common solvent for the reagents, typically DMAC, NMP, THF, diphenylphosphate, m-cresol, di (m-cresyl) phosphate, and the like.

Once the reaction is complete, the polyquinoline having NLO side chains is precipitated with a lower alkyl alcohol, such as methanol or isopropanol, filtered and dried under vacuum. The polymer can then be further purified by conventional methods, typically by repeated dissolution and reprecipitation from the lower alkyl alcohol.

One advantage obtained from the use of polyquinolines is that the electron withdrawing moieties of the NLO compounds of the present invention are not sensitive to the relatively mild reaction conditions under which polyquinolines are polymerized. Accordingly, polyquinolines having NLO side chains covalently attached thereto may be directly polymerized from monomers having the NLO side chains. It is not necessary to use monomers having pre-NLO side chains without electron withdrawing groups, which form polymers having the pre-NLO side chains that must .be further reacted to attach electron withdrawing groups. This greatly simplifies the preparation of polymers having covalently attached NLO side chains.

Films of the polyquinoline-NLO compound combinations of the present invention may be formed by spin-coating, after which the films may be repetitively annealed prior to poling at an elevated temperature near the $T_g$ of the material. Following annealing, the dipoles of the NLO compounds may be aligned by the application of an intense electric field (0.2–1.0 MV cm$^{-1}$) at temperatures near the $T_g$. The foregoing sequence of spin-coating, annealing and poling is essentially conventional and disclosed in U.S. Pat. No. 4,935,292, the disclosure of which is hereby incorporated herein by reference thereto.

It is disclosed in U.S. Pat. No. 4,932,292 and SPIE Proceeding No. 1147, 74–83 (1989) that further stabilization of the NLO side chain alignment can be achieved by a radiation-induced or chemical-induced cross-linking of the polymer matrix. This procedure is also essentially conventional, and the disclosure of which in U.S. Pat. No. 4,935,292 is also hereby incorporated herein by reference thereto.

The electro-optic coefficient of an NLO-active poled polymer film is proportional to the product of the molecular second order nonlinear optical susceptibility coefficient, $\beta$, and the molecular ground state electric dipole moment, $\mu$. The molecular $\beta$ is dependent upon the frequency at which the measurement is performed because of the resonance effect near the absorption peak. A method to compare molecules with different absorption properties by extrapolation of the $\beta$ value measured at a specific frequency to zero frequency using a two-level model is disclosed by Singer, *J. Opt. Soc. Am.*, B6, 1339–50 (1989). The $\beta$ value at the extrapolated frequency is defined $\beta_0$. The NLO-active molecules of the present invention can exhibit values of the $\beta_0\mu$ product as high as about 4200 in units of $10^{-48}$ esu measured at a wavelength of 1907 nm.

Thus, it can be appreciated that the present invention provides compositions of matter exhibiting NLO properties based on guest NLO compounds in combination with polymer matrices that are stable at the elevated temperature conditions at which annealing and dipole aligning steps are typically performed, and which do not subject the NLO compound to strenuous processing conditions. The less severe processing conditions make it possible to use the host polymer polyquinolines with a wide variety of NLO compounds than heretofore possible with polymer-NLO compound combinations. The polyquinolines also possess the physical, mechanical and optical properties required of an optical material.

The following examples further illustrate the present invention, and are not to be construed as limiting the scope thereof. Unless otherwise indicated, materials were obtained from Aldrich Chemical Supply. All parts and percentages are by weight, unless expressly indicated to be otherwise, and all temperatures are in degrees Celsius.

EXAMPLES

Example 1

Preparation of a Polyquinoline Based NLO Compound

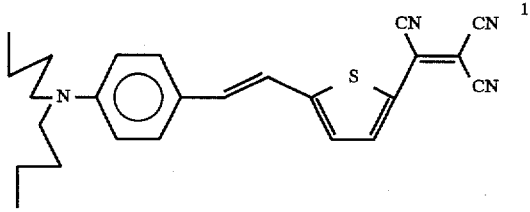

The tricyanovinylated phenyl thiophene stilbene 1 was synthesized by first preparing a phenyl thiophene stilbene according to the procedure of Example 1 of copending and commonly owned U.S. patent application Ser. No. 626,358, the disclosure of which is hereby incorporated herein by reference thereto. In particular, p-N,N'-dibutyl benzaldehyde was reacted with thiopene phosphonate ester. The resulting phenyl thiophene was then tricyanovinylated by reacting the compound with tetracyanoethylene in dimethylformamide at 70° C. according to the procedure described in Example 6 of copending and commonly owned U.S. patent application Ser. No. 773,708 filed Oct. 9, 1991, the disclosure of which is hereby incorporated herein by reference thereto.

55.0 mg of the tricyanovinylated phenyl thiophene stilbene was added to 2.0 g of a viscous 15% solids solution of a polyquinoline in cyclopentanone. (PQ-100 from Maxdem, Inc. of San Dimas, Calif.).

The mixture was rolled in a sealed vial on a hot dog roller for three hours. The resulting greenish viscous solution was used to perform spin-coating on regular glass and indium tin oxide (ITO) glass for thermal stability and poling evaluation.

In particular, the solution of the polyquinoline and the tricyanovinylated phenyl thiophene stilbene was then spin-coated on a glass slide and a conductive ITO glass slide using a spin rate of 2,500 rpm to get a uniform coating. The film thickness was estimated by fringe interference method to be between about 2.0 and about 5.5 microns.

The film was dried in a vacuum oven at 120° C. for four days, and then a thin layer of gold was evaporated on the top to form a poling electrode layer. The film was then heated in a hot stage under argon at 120° C. for one-half hour and then slowly raised to 160° C. with an electric field of 0.5 MV/cm applied to the film. The poled film was measured by using a thin film reflection technique to get an electro-optic coefficient $r_{33}$ of 30 pm/V.

Example 2

Preparation of Polyquinoline Based NLO Material

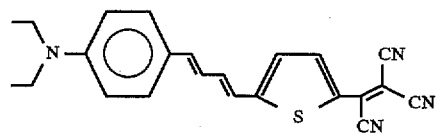

Trans-p-N,N-dibutylcinnamaldehyde was reacted with thiophene phosphonate ester. The resulting compound was then tricyanovinylated by reacting with tetracyanoethylene according to the same procedure described in Example 1.

A polyquinoline solution of the above compound was prepared as in Example 1 by dissolving 75.0 mg of the tricyanovinylated compound 2 in 2.0 g of the PQ-100 solution. The solution was spin-cast as in Example 1 to yield films containing 20% by weight of the NLO compound. The films were then dried, annealed and poled as in Example 1, to yield films having an $r_{33}$ value of 44 pm/v.

The thermal stability of the poled polyquinoline was demonstrated by heating the poled sample in an oven at 80° C. for over two months. The electro-optic activity of the sample showed an initial drop to 60% of its original value within 100 hours, then remained unchanged during the balance of the testing time period.

Significantly, the foregoing examples illustrate how the present invention makes it possible to directly combine a tricyanovinylated NLO compound with a polyquinoline matrix polymer that is stable at annealing and poling temperatures. The tricyanovinyl group of the NLO compound remains stable, despite being sensitive to severe reaction conditions. The NLO compositions of the present invention thus possess a desirable combination of NLO properties and thermal and chemical stability. At the same time, the compositions have good solubility and processing solvents, high laser damage thresholds, are easily synthesized and have well-known and understood chemical properties. Because of the less strenuous conditions involved, a wide variety of guest NLO compounds can be incorporated into host polyquinolines to create a versatile family of compounds that can be readily varied to increase second order NLO properties.

The foregoing examples and description of the preferred embodiment should be taken as illustrating, rather than as limiting, the present invention as defined by the claims. As will be readily appreciated, numerous variations and combinations of the features set forth above can be utilized without departing from the present invention as set forth in the claims. All such modifications are intended to be included within the scope of the following claims.

What is claimed is:

1. A composition exhibiting second order nonlinear optical properties comprising a non-centrosymmetric aromatic nonlinear optical compound possessing a delocalized resonance configuration as a guest in a host polyquinoline polymer matrix.

2. The composition of claim 1, wherein said nonlinear optical compound has a structure selected from the group consisting of:

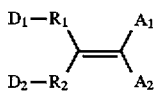

wherein D, R and A and $D_1$, $D_2$, $R_1$, $R_2$, $A_1$ and $A_2$ form delocalized resonance configurations in which R, $R_1$ and $R_2$ are independently selected from the group consisting of pi-conjugated aromatic ring moieties, A, $A_1$ and $A_2$ are independently selected from the group consisting of electron withdrawing moieties and D, $D_1$ and $D_2$ are independently selected from the group consisting of ring-substituted electron donating moieties.

3. The composition of claim 2, wherein said pi-conjugated aromatic moieties comprise from one to ten aromatic rings or fused ring systems.

4. The composition of claim 3, wherein said pi-conjugated aromatic moieties comprise at least one heteroaromatic ring, or at least one fused ring system comprising a heteroaromatic ring.

5. The composition of claim 4, wherein said heteroaromatic ring comprises a five-membered heteroaromatic ring having the structure:

wherein Y is C or N and X is selected from the group consisting of O, S, Se, Te, N and N-alkyl.

6. The composition of claim 5, wherein all of said rings comprise said five-membered heteroaromatic ring and all of said fused ring systems contain said five-membered heteroaromatic ring.

7. The composition of claim 3, wherein said pi-conjugated aromatic moieties comprise from two to four aromatic rings or fused ring systems.

8. The composition of claim 7, wherein at least two adjacent rings or fused ring systems are linked together by a conjugated functional group comprising from one to three moieties independently selected from the group consisting of —N=N—, —CH=N—, —CH=N—N=CH—, —C≡C— and (—CH=CH)$_j$—, wherein j is from one to three.

9. The composition of claim 7, wherein at least two adjacent rings or fused ring systems are linked together by a non-conjugated linkage.

10. The composition of claim 7, wherein said two or more rings or fused ring systems comprise at least two adjacent rings or fused ring systems directively covalently bonded together without forming a fused structure of said adjacent pair.

11. The composition of claim 3, wherein said pi-conjugated aromatic moieties comprise one or more aromatic rings independently selected from the group consisting of pyrrole, n-alkyl pyrrole, furan, thiophene, imidazole, oxazole, thiophene, thiazole, triazole, tetrazole, pyrazole, pyrimidine, purine, quinolines, carbazole, benzene, naphthalene, furazan, pyrazine, indole, isoindole, indazole, phenothiazine, benzotriazole, anthracine, phenanthrene, quinazoline, pteridine, azophenanthrenes, pyrrones and chromones.

12. The composition of claim 11, wherein said one or more aromatic rings are independently selected from the group consisting of benzene, pyrrole, furan, thiophene, thiazole and oxazole.

13. The composition of claim 2, wherein said electron accepting moieties are selected from the group consisting of —NO$_2$, —CN, —CHO, —COR$_3$, —COOR$_3$, —PO(OR$_3$)$_2$, —SO$_2$R$_3$, —SO$_3$R$_3$, —PO(R$_3$)$_2$, dicyanovinyl-pyrones and —CX=CYZ, wherein X, Y and Z are independently selected from the group consisting of hydrogen, —CN, —NO$_2$, —COR$_3$, —COOR$_3$, —SO$_2$R$_3$, —PO(R$_3$)$_2$ and —PO(OR$_3$)$_2$, wherein R$_3$ is selected from the group consisting of alkyl moieties containing up to 15 carbon atoms.

14. The composition of claim 13, wherein said electron accepting moieties comprise tricyanoethylene.

15. The composition of claim 2, wherein said electron accepting moieties are selected from the group consisting of N,N-dialkylbarbituric acids, N,N-dialkylthiobarbituric acids, N,N-diarylbarbituric acids, N,N-diarylthiobarbituric acids, rhodamines, hydrantoins, oxazolines and ring moieties having the structure:

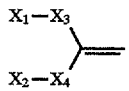

in which $X_1$ and $X_2$ form a saturated or unsaturated five- to eight-member cyclic ring or two-ring system having five- to eight-member rings, and $X_3$ and $X_4$ are independently SO$_2$ or:

wherein $X_5$ is selected from the group consisting of O, S and C$_1$I$_2$, wherein $I_1$ and $I_2$ are independently selected from the group consisting of —CN, —NO$_2$, —COR$_3$, —COOR$_3$, —SO$_2$R$_3$, —PO(R$_3$)$_2$ and —PO(OR$_3$)R$_2$, and R$_3$ is an alkyl group containing up to 15 carbon atoms.

16. The composition of claim 15, wherein said electron accepting moieties are selected from the group consisting of 3-dicyanovinylindane-1sulfone, 1,3-bissulfonyl-indane, indane-1,3-dione, 3-dicyanovinylindane-1-one and 1,3-bisdicyanovinylindane.

17. The composition of claim 2, wherein A comprises a first electron accepting moiety and said nonlinear optical compound having the structure:

further includes a second electron accepting moiety attached to the same ring as said first electron accepting moiety, so that said delocalized resonance configuration is maintained.

18. The composition of claim 2, wherein said electron donating moieties are selected from the group consisting of —NR₆R₇, —OR₈, —SR₈, —SR₈, —TeR₈, —SeR₈, —CH=NR₉, —CH=N—NR₆R₇ and —CH=C[N(R₆R₇)]₂, wherein R₆ and R₇ are independently selected from the group consisting of hydrogen, alkyl groups containing up to 12 carbon atoms and alkyl groups functionalized with nucleophilic substituents containing up to 12 carbon atoms, or R₆ and R₇ together form a cyclic group containing up to 8 carbon atoms; R₈ is selected from the group consisting of hydrogen, alkyl groups containing up to 6 carbon atoms and alkyl groups functionalized with nucleophilic substituents containing up to 6 carbon atoms; and R₉ is selected from the group consisting of hydrogen, alkyl groups containing up to 10 carbon atoms and alkyl groups functionalized with nucleophilic substituents containing up to 10 carbon atoms.

19. The composition of claim 18, wherein R₆, R₇, R₈ and R₉ represent alkyl groups functionalized with nucleophilic substituents selected from the group consisting of alkoxy, aminoalkyl, alkylhalide, hydroxyalkyl, alkylsulfide, alkylisocyanate, alkylisothiocyanate, alkylthiol, alkylazide, alkylcarboxylic, alkylsulfonic, alkylalkene and alkylalkyne groups.

20. The composition of claim 18, wherein R₆ and R₇ together form a cyclic group selected from the group consisting of pyrrolidine, piperidine, piperazine and morpholine groups.

21. The composition of claim 2, wherein said electron donating moieties have the structure:

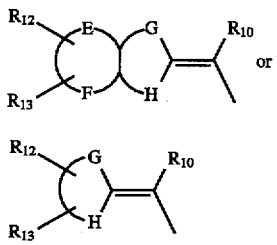

wherein E, F, G and H are members of a saturated or unsaturated five- to eight-membered cyclic ring or two-ring system having five- to eight-membered rings that are electron donating in nature and are independently selected from the group consisting of —CH—, —CH₂—, O, N, S, Se, Te and —NR₁₁; and R₁₀, R₁₁, R₁₂ and R₁₃ are independently selected from the group consisting of hydrogen, alkyl groups containing up to 18 carbon atoms and alkyl groups functionalized with nucleophilic substituents containing up to 18 carbon atoms.

22. The composition of claim 21, wherein said electron donating moieties are selected from the group consisting of 1,3-dithiolium, 2-benzo-1,3-dithi-olium and 2-ethylenedithio-1,3-dithiolium moieties.

23. The composition of claim 2, wherein D comprises a first electron donating moiety and said nonlinear optical compound having the structure:

D—R—A further includes a second electron donating moiety attached to the same ring as said first electron donating moiety, so that said delocalized resonance configuration is maintained.

24. The composition of claim 1, wherein said polyquinoline has a intrinsic viscosity between about 1.5 and about 2.5 dL/g.

25. The composition of claim 1, comprising a blend of said guest nonlinear optical compound in said host polyquinoline.

26. The composition of claim 25, wherein said nonlinear optical compound is present at a level between about 10 and about 30 weight percent.

27. The composition of claim 1, wherein said nonlinear optical compound is covalently linked to monomeric subunits of said polyquinoline.

28. The composition of claim 27, wherein said nonlinear optical compound comprises at least one electron donating moiety covalently linking said compound to a monomeric subunit of said polyquinoline, and said electron donating moiety comprises an alkyl moiety functionalized with a nucleophilic substituent containing between 3 and 12 carbon atoms, wherein said functionalized alkyl moieties are selected from the group consisting of alkoxy, aminoalkyl, alkylhalide, hydroxyalkyl, alkylsulfide, alkylisocyanate, alkylisothiocyanate, alkylthiol, alkylazide, alkylcarboxylic, alkylsulfonic, alkylalkene and alkylalkyne groups.

29. The composition of claim 28, wherein said polyquinoline comprises a plurality of monomeric subunits covalently linked to a nonlinear optical compound via an electron donating group of said nonlinear optical compound, so that the ratio of said monomeric subunits covalently linked to a nonlinear optical compound to monomeric subunits without a nonlinear optical compound covalently linked thereto is between about 1:99 and about 90:10.

30. The composition of claim 29, wherein said ratio is about 25:75.

31. The composition of claim 1, wherein said polyquinoline is cross-linked.

32. The composition of claim 1, wherein said nonlinear optical compound has an external field-induced molecular alignment.

33. The composition of claim 1, wherein said polyquinoline comprises monomeric repeating units with structures selected from the group consisting of:

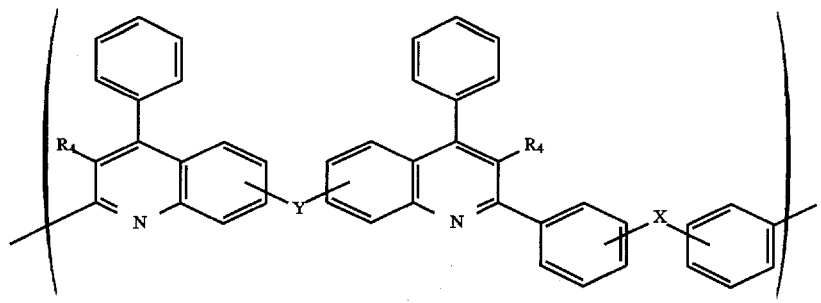

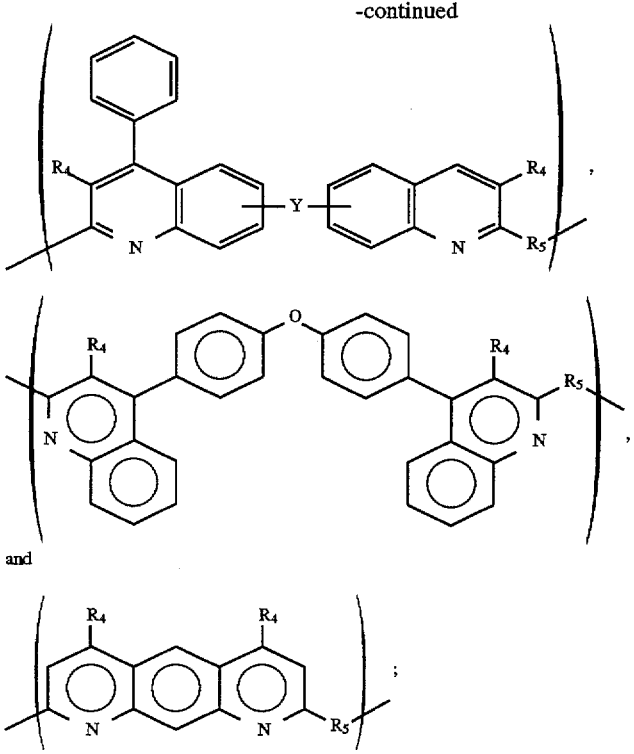
and
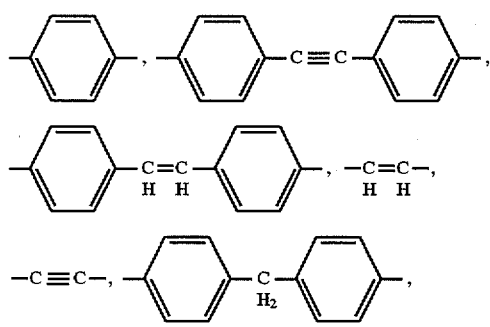
wherein X or Y may each independently represent a covalent linkage between ring structures, or X and Y are independently selected from the group consisting of O, S, F, O$_2$,
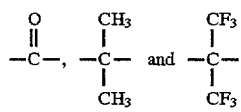
the ring structures linked by X and Y are substituted meta- or para- to one another by X or Y;
R$_4$ is H or phenyl; and
R$_5$ is selected from the group consisting of:
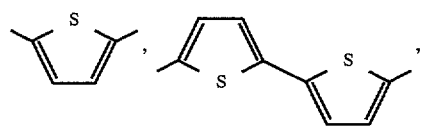
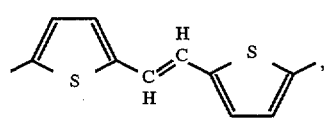
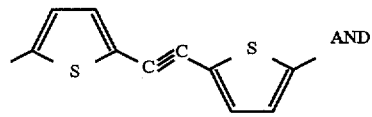
-continued
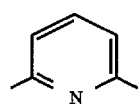
* * * * *

UNITED STATES PATENT AND TRADEMARK OFFICE
CERTIFICATE OF CORRECTION

PATENT NO.    : 5,679,763
DATED         : October 21, 1997
INVENTOR(S)   : Jen et al.

It is certified that error appears in the above-identified patent and that said Letters Patent is hereby corrected as shown below:

In the Abstract, line 1 "exhibiting a second" should read --exhibiting second--.

Column 5, line 26, "alternating and" should read --alternating "up" and--.

Column 6, line 63, "1sulfone" should read --1-sulfone--.

Column 12, line 57, "must .be" should read --must be--.

Column 15, line 22, within claim 2, after "consisting of:" and before the formula, insert:
-- D-R-A
   and --.

Column 16 line 56, third line of claim 16, "1sulfone" should read --1-sulfone--.

Signed and Sealed this

Tenth Day of March, 1998

*Attest:*

BRUCE LEHMAN

*Attesting Officer*          *Commissioner of Patents and Trademarks*